Patented Dec. 1, 1942

2,303,430

UNITED STATES PATENT OFFICE 2,303,430

PROCESS FOR THE PREPARATION OF PURIFIED LATEX AND OF RUBBER, GUTTA PERCHA, BALATA, AND THE LIKE

Hendrik Roeloff Braak, Batavia-Centrum, Java, Dutch East Indies, assignor to Rubber Stichting (Rubber Foundation), Amsterdam, Netherlands No Drawing. Application June 26, 1939, Serial No. 281,264. In the Netherlands June 27, 1938

5 Claims. (Cl. 260—817)

This invention relates to a process for the preparation of purified latex and for the preparation of rubber, gutta percha, balata, jelutong, abiurana, gondang and the like therefrom.

For simplicity's sake in the following all these substances will be included in the term "rubber."

The close relation between the producers of crude rubber and the manufacturers of rubber articles has disclosed the need for a more uniform crude rubber. Notwithstanding important results obtained in this direction by improvements of the methods applied at the rubber plantations and particularly under the influence of standardisation it will be clear that further improvements are by nature limited by the fact that rubber latex contains besides the rubber hydrocarbon a great number of non-rubber constituents of which the content depends on various factors, such as for instance the tapping system, climatologic and soil conditions, season, origin and age of the trees, etc., so that even the plantation product prepared in the most careful way never is entirely uniform. Since it is impossible to control the amount of non-rubber constituents a further improvement in making the rubber product uniform can only be obtained by the preparation of a rubber of higher purity.

Such a rubber of higher purity is not only of importance with a view to uniformity but also possesses other valuable properties. It has been shown by various investigators that certain less desirable properties of the crude rubber, such as the disagreeable smell of rubber articles, the water absorbing properties of rubber in unvulcanized and vulcanized state, uncontrollable variations in the miscibility with fillers, and in the rate of vulcanization must be ascribed to the presence and the varying amount of non-rubber constituents such as sugars, alcohols, salts, proteins, acids, etc. In addition it is beyond doubt that just as well as the rate of vulcanization and the properties of the vulcanized rubber are influenced by the non-rubber constituents, also other reactions of the rubber tended to obtain an improved material or derivatives will be influenced by these non-rubber constituents.

An object of the invention is to remove these non-rubber constituents as far as possible and to obtain in a technically simple way a highly purified rubber. To this end many processes have already been recommended. Thus it has been proposed to wash rubber intensively after coagulation, to cream up latex once or several times, to dialyse latex or to subject latex to a pre-coagulation, but none of these methods gives a result which is satisfactory in all respects. Either these processes are too expensive, for instance the intense washing, or the purification is insufficient for instance in dialysis or once creaming up, or part of the rubber is lost, for instance in pre-coagulation.

It is also known to decompose the proteins by treatment of the latex with lye at increased temperature in an autoclave. To this end the British Patent 354,380 describes a method of treating latex with sodium hydroxide in an autoclave at 145–150° C., followed by coagulation by means of acetic acid and washing out. The use of autoclaves renders this process unsuitable for application on commercial scale in the country of origin of the rubber, except in well-equipped factories under the steady supervision of scientifically trained employees. Moreover the durability of the rubber is unfavorably influenced by this treatment.

In the German Patent 460,950 it is described to treat latex with diluted sodium hydroxide at approximately 50° C. several times, followed by creaming up, removal of the serum and dialysis, all the operations being carried out in an atmosphere of nitrogen. Since this process is far too slow and cumbrous for putting it into practice on commercial scale, the German Patent 547,581 suggests an improvement in which the treatment of the latex with lye is again executed in an autoclave above 100° C., whereupon if desired after dialysis coagulation and washing out take place. The use of autoclaves prevents again the application of this process on commercial scale in the country of origin of the rubber.

The German Patent 579,377 suggests heating latex under normal pressure and absolutely below the boiling point of the liquid during several hours, whereby the proteins are converted into soluble compounds not-precipitating after addition of coagulants and which consequently may be washed out with the serum after coagulation of the rubber. Though this process is a considerable simplification with regard to methods executed in autoclaves, also in this case a careful control of temperature is required since at a too high temperature viz, the boiling point, the danger arises that decomposition products are formed which also precipitate during the coagulation. The process of the invention on the contrary is worked out and adapted to the treatment of latex in the country of origin, where leaving aside some exceptions, in general no elaborate and expert laboratory supervision is available.

The process of the invention consists herein that latex is heated under normal pressure with lye at boiling temperature and thereupon subjected to dialysis.

This process is extremely simple, may be executed in open vessels and needs hardly any supervision. The decomposition products of the proteins formed at the boiling temperature are readily removable by dialysis.

Further it has appeared that it is to be preferred to effect this dialysis at high temperature since at high temperature the dialysis is effected quicker and more completely than at lower temperature.

The dialysis membrane may consist of any suitable substance but according to the invention it is preferred to employ regenerated cellulose, such as Cellophane, which gives very satisfactory results, also at high temperatures. Preferably the latex flows through a seamless tube or coil of regenerated cellulose at the exterior of which boiling water flows in counter current. The used water needs not to be distilled water, though distilled water is preferred. It is in general sufficient to use water which is normally used in rubber plants for washing crepe rubbers on the batteries.

It has appeared to be of advantage in the dialysis to dilute the latex beforehand preferably to approximately 20% of rubber. According to the invention this may be combined with the heating of the latex by introducing open steam into the latex during the heating with lye, for instance by means of a perforated heating plate or tube, whereby the latex is heated to its boiling point as well as being diluted. Immediately thereupon the latex may be dialyzed and in this way profit is taken from the high temperature of the latex as well as from the dilution. Moreover heating with direct steam has the advantage that no danger of caking exists. It may be advantageous to stir the latex during heating.

As lye may be used sodium hydroxide, but it is not necessary to employ pure NaOH. Also commercial sodium hydroxide containing a little NaCl gives no trouble. Obviously instead of NaOH other alkaline hydroxides may be used, particularly potassium hydroxide. Sodium hydroxide is however preferred on account of its cheapness.

The latex obtained by the process of this invention has a much lower content of non-rubber constituents than normal latex. This is of importance in all processes in which latex is used, for instance for the preparation of rubber powder.

If the latex is coagulated it is preferably diluted previously, for instance to 5%. The coagulum so obtained may be washed in normal way and worked up into sheets for instance in a crepe or sheet battery and dried by the ordinary method. Because however the drying speed is less than of rubber obtained from non-purified latex, it is of advantage either to coagulate the purified (and if desired diluted) latex in such a way, that a porous coagulum is obtained, or to crumble the coagulum in a disintegrator or other suitable machine, after which the product obtained according to one of these methods is dried in a furnace under vacuum or not.

The rubber obtained according to the invention possesses all the advantages mentioned above for a purified rubber. Furthermore it has appeared that the rubber obtained with the process according to the invention has a larger plasticity.

Although the above description has been directed primarily to the purification of rubber latex, the process described is also applicable to latices of other similar products, such as gutta percha, balata, abiurana, jelutong, gondang and the like.

The invention is elucidated by the following example to which it is, however, in no way restricted.

Example

Fresh latex or latex preserved with ammonia, alkali or if desired other means, of normal concentration, is first purified of dirt constituents if any through a sieve and if necessary the filtered latex freed from floating foam.

Under stirring the clean latex is mixed with a solution of sodium hydroxide in pure water. Per liter of latex 10 grams of NaOH are added dissolved in 20 grams of water.

The so obtained alkaline latex is then maintained at boiling temperature during 2 hours by means of open steam (perforated heating plate) if desired supported by indirect heating.

After finishing the heating process the liquid is—if necessary—diluted with pure water to such an extent, that the concentration of dry substance in the latex is about 20%.

This 20% latex is subjected to dialysis against water at about boiling temperature, which dialysis is continued such a long time till substantially no lye reaction can be perceived in the outflowing water.

The latex purified by dialysis is thereupon diluted to a concentration of about 5% and subsequently coagulated with a weak acid solution.

The so obtained coagulum can be worked up in a normal crepe or sheet battery, under rinsing with water, to a thin sheet and be dried in normal way or be made smaller in a way indicated before-hand (the coagulation can also be effected in such a way that a porous coagulum is obtained) and the spongelike or crumbled coagulum dried in a furnace.

In order to give an impression of the results which may be obtained with the above described process it be mentioned here that in a particular case employing a sample of fresh latex with a concentration of 31%, after dilution of this latex to 20% and subsequent coagulation with formic acid a coagulum was obtained, giving after creping and washing on an ordinary crepe battery, followed by drying, a crepe which at analysis appeared to possess a nitrogen content of 0.467%, whereas on the other hand the same latex after boiling with lye and dialysis in the way indicated, followed by coagulation with formic acid at a concentration of the latex of 5% gave a coagulum giving after creping under rinsing with water and drying an end-product with 0.08% nitrogen. The water absorption of these samples, as determined by immersion in pure water (at 26° C.) of a sheet prepared from the crepe in a particular standardized way of 1 square decimeter surface and about 3 mm. thickness, was in the first case after 45 days 1581 mg. (corresponding to about 5.2% of the weight) in the second case after 45 days 255 mg. (0.8% of the weight). A sample of normal plantation crepe chosen at random, when examined in the same way, showed a water absorption of 1451 mg.

The results described in this example are in no way to be considered as values which are the best obtainable, but, depending on the composition of the latex itself, as well as on the more or less intensive dialysis and after washing, these results can be easily improved.

What I claim is:

1. In the manufacture of purified latices of rubber, balata, gutta percha, jelutong, abiurana, gondang and the like of higher purity and improved uniformity in composition and properties and capable of producing purer and more uniform rubbers having an improved resistance against water absorption and a favorable durability, the process which comprises boiling a crude latex in the presence of a caustic alkali solution by the introduction of open steam under normal pressures, in order to to dilute said latex, and then subjecting the resulting diluted latex to dialysis.

2. In the manufacture of purified latices of rubber, balata, gutta percha, jelutong, abiurana, gondang and the like of higher purity and improved uniformity in composition and properties and capable of producing purer and more uniform rubbers having an improved resistance against water absorption and a favorable durability, the process which comprises boiling a crude latex at normal pressures in the presence of a caustic alkali solution and immediately subjecting the boiled latex to dialysis at elevated temperatures approximating its boiling point by passing the latex through a seamless tube constructed of regenerated cellulose, said tube being in contact with a dialyzing medium.

3. The process of claim 2 wherein the latex is boiled by the introduction of open steam at normal pressures.

4. In the manufacture of purified latices of rubber, balata, gutta percha, jelutong, abiurana, gondang and the like of higher purity and improved uniformity in composition and properties and capable of producing purer and more uniform rubbers having an improved resistance against water absorption and a favorable durability, the process which comprises boiling a crude latex under normal pressures in the presence of a small quantity of caustic alkali solution for a period of about 2 hours, subjecting the boiled latex to dialysis and coagulating the dialyzed latex.

5. In the manufacture of purified latices of rubber, balata, gutta percha, jelutong, abiurana, gondang and the like of higher purity and improved uniformity in composition and properties and capable of producing purer and more uniform rubbers having an improved resistance against water absorption and a favorable durability, the process which comprises boiling a crude latex under normal pressures in the presence of a small quantity of caustic alkali solution and then dialyzing the boiled latex at elevated temperatures approximating the boiling point of said latex.

HENDRIK ROELOFF BRAAK.